(12) United States Patent
Nakano et al.

(10) Patent No.: US 9,719,794 B2
(45) Date of Patent: Aug. 1, 2017

(54) ROUTE DISPLAY METHOD, ROUTE DISPLAY APPARATUS, AND DATABASE GENERATION METHOD

(71) Applicant: Panasonic Intellectual Property Corporation of America, Torrance, CA (US)

(72) Inventors: Toshihisa Nakano, Osaka (JP); Tohru Wakabayashi, Hyogo (JP); Yuko Yamamoto, Kyoto (JP); Masahiro Ito, Osaka (JP); Kimio Minami, Nara (JP); Kazuo Okamura, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/844,028

(22) Filed: Sep. 3, 2015

(65) Prior Publication Data

US 2016/0069703 A1    Mar. 10, 2016

Related U.S. Application Data

(60) Provisional application No. 62/048,441, filed on Sep. 10, 2014.

(30) Foreign Application Priority Data

May 28, 2015 (JP) ................................ 2015-108441

(51) Int. Cl.
*G01C 21/36* (2006.01)
*G06T 1/00* (2006.01)
(Continued)

(52) U.S. Cl.
CPC ..... *G01C 21/3667* (2013.01); *G01C 21/3605* (2013.01); *G01C 21/3644* (2013.01);
(Continued)

(58) Field of Classification Search
None
See application file for complete search history.

(56) References Cited

U.S. PATENT DOCUMENTS 5,559,707 A * 9/1996 DeLorme .............. G01C 21/20
340/990
6,148,090 A * 11/2000 Narioka ............... G09B 29/106
382/113

(Continued)

FOREIGN PATENT DOCUMENTS

JP    2005-004480    1/2005
JP    2006-337154    12/2006

OTHER PUBLICATIONS

The Partial European Search Report dated Feb. 17, 2016 for the related European Patent Application No. 15183693.9.

(Continued)

*Primary Examiner* — Faris Almatrahi
*Assistant Examiner* — Tamara Weber
(74) *Attorney, Agent, or Firm* — Greenblum & Bernstein, P.L.C.

(57) ABSTRACT

A route display method for display on a terminal apparatus comprises: acquiring starting point information indicating a starting point and destination information indicating a destination; generating route information indicating a route from the starting point to the destination, wherein the route information includes a plurality of passing points; extracting captured images corresponding to the plurality of the passing points from a database which stores the captured images in relation to corresponding image capturing locations respectively, wherein each of the image capturing locations is within a range from the each of the plurality of the passing points; and displaying the extracted captured images in association with a map image sequentially in an order from a first captured image corresponding to a first passing point (Continued)

closest to the starting point to a second captured image corresponding to a second passing point closest to the destination.

18 Claims, 12 Drawing Sheets

(51) Int. Cl.
*G06F 17/30* (2006.01)
*G09B 29/00* (2006.01)

(52) U.S. Cl.
CPC ..... *G01C 21/3676* (2013.01); *G01C 21/3694* (2013.01); *G06F 17/3028* (2013.01); *G06F 17/30268* (2013.01); *G06T 1/0007* (2013.01); *G09B 29/007* (2013.01)

(56) References Cited

U.S. PATENT DOCUMENTS

| | | | | |
|---|---|---|---|---|
| 6,339,746 | B1* | 1/2002 | Sugiyama | G08G 1/005 340/323 R |
| 6,525,768 | B2* | 2/2003 | Obradovich | G08G 1/096716 348/135 |
| 6,868,169 | B2* | 3/2005 | Staas | G06F 17/30265 382/113 |
| 7,191,059 | B2* | 3/2007 | Asahara | G01C 21/3453 701/410 |
| 7,827,507 | B2* | 11/2010 | Geise | G01C 21/36 715/848 |
| 8,209,120 | B2* | 6/2012 | Breed | G08G 1/161 340/539.2 |
| 9,131,376 | B2* | 9/2015 | Bondesen | H04W 12/06 |
| 9,195,290 | B2* | 11/2015 | Siliski | G01C 21/265 |
| 2003/0011676 | A1 | 1/2003 | Hunter et al. | |
| 2004/0252192 | A1 | 12/2004 | Adachi et al. | |
| 2008/0046178 | A1 | 2/2008 | Tava et al. | |
| 2012/0123678 | A1* | 5/2012 | Poppen | G01C 21/3476 701/468 |
| 2012/0331020 | A1* | 12/2012 | Morishita | G06F 17/3028 707/822 |
| 2014/0244110 | A1 | 8/2014 | Tharaldson et al. | |

OTHER PUBLICATIONS

Tina Sieber: "5 Tools to Take an Auto-Guided Google Street View Tour Tools to Take an Auto-Guided Google Street View Tour", www.makeuseof.com, Oct. 9, 2013 (Oct. 9, 2013), XP055245397, Retrieved from the Internet: URL: www.makeuseof.com/tag/5-tools-to-take-an-auto-guided-google-street-view-tour/ [retrieved on Jan. 27, 2016].

* cited by examiner

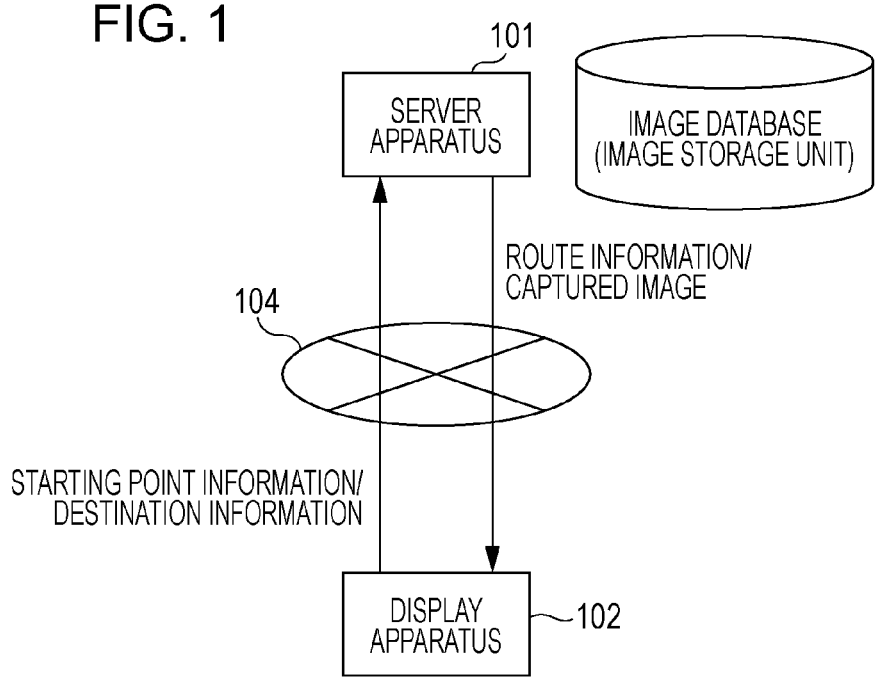
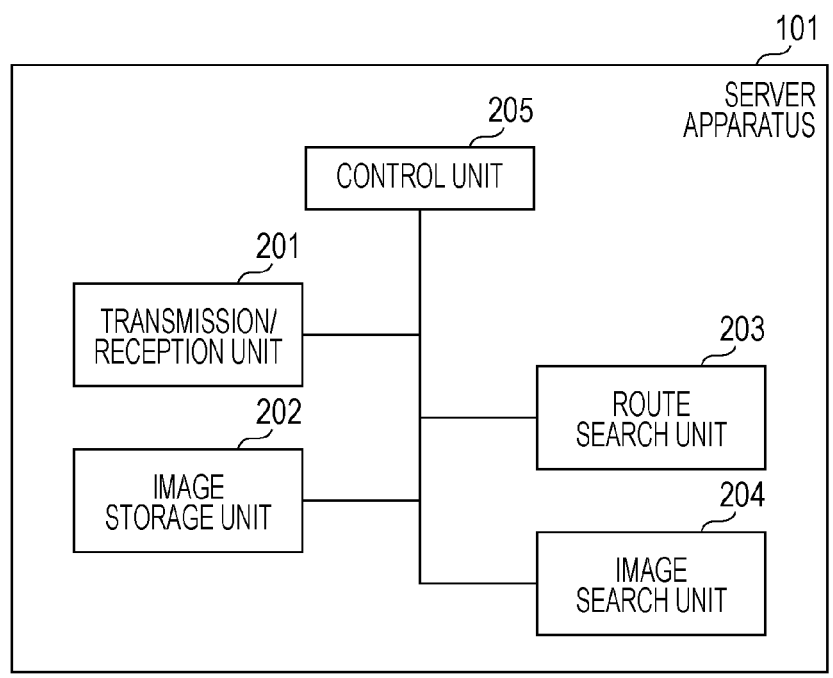

FIG. 3

| IMAGE CAPTURING DATE/TIME | LATITUDE | LONGITUDE | TRAVELLING DIRECTION | IMAGE FILE NAME |
|---|---|---|---|---|
| 6/3/2014 19:16:21 | +34.750631 | +135.579582 | 45° | 00231924.jpg |
| 6/3/2014 19:16:22 | +34.751301 | +135.580419 | 45° | 00231925.jpg |
| 6/3/2014 19:16:23 | +34.751830 | +135.581138 | 47° | 00231926.jpg |
| : | : | : | : | : |

00231924.jpg  00231925.jpg  00231926.jpg

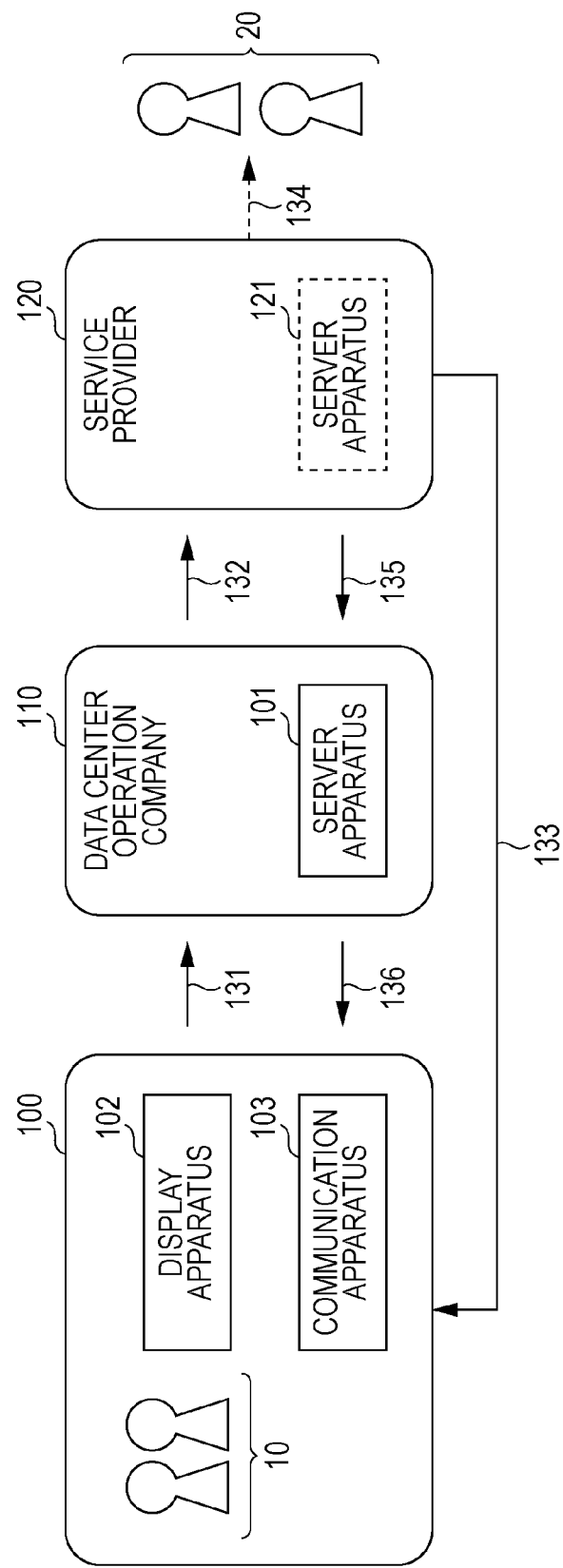

FIG. 11

| IMAGE CAPTURING DATE/TIME | LATITUDE | LONGITUDE | TRAVELLING DIRECTION | WEATHER | ROAD TYPE | LANE | IMAGE FILE NAME |
|---|---|---|---|---|---|---|---|
| 6/3/2014 (Tue) 19:16:21 | +34.750631 | +135.579582 | 45° | FINE | ORDINARY ROAD | LEFT LANE | 00231924.jpg |
| 6/3/2014 (Tue) 19:16:22 | +34.751301 | +135.580419 | 45° | FINE | ORDINARY ROAD | LEFT LANE | 00231925.jpg |
| 6/3/2014 (Tue) 19:16:23 | +34.751830 | +135.581138 | 47° | FINE | ORDINARY ROAD | LEFT LANE | 00231926.jpg |
| .. | .. | .. | .. | .. | .. | .. | .. |
| 6/22/2014 (Sun) 15:04:12 | +34.71015 | +135.592146 | 320° | RAINY | EXPRESSWAY | RIGHT LANE | 00358592.jpg |

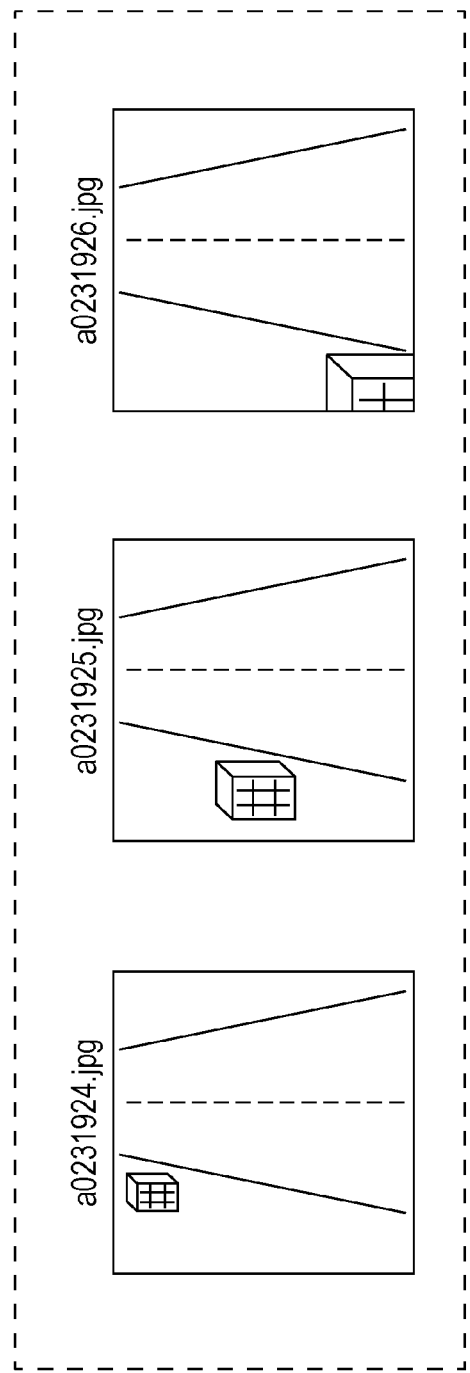

ROUTE DISPLAY METHOD, ROUTE DISPLAY APPARATUS, AND DATABASE GENERATION METHOD

BACKGROUND

1. Technical Field

The present disclosure is related to a method of displaying a route in a route display system from a starting point to a destination, a route display apparatus that displays a route from a starting point to a destination, and a method of generating a database used in the route display system.

2. Description of the Related Art

In recent years, use of an apparatus such as an in-vehicle camera, a drive recorder, a street camera, a smartphone camera, or the like has become popular, and now a large number of such apparatuses are used to take a still or moving image of a road condition or a traffic condition (see, for example, Japanese Patent No. 3988683, Japanese Unexamined Patent Application Publication No. 2006-337154).

SUMMARY

However, in the conventional technique described above, a further improvement is necessary.

In one general aspect, the techniques disclosed here feature that a route display method for display on a terminal apparatus comprising: acquiring i) starting point information indicating a starting point and ii) destination information indicating a destination; generating route information indicating a route from the starting point to the destination, wherein the route is searched based on the starting point information and the destination information, and the route information includes a plurality of passing points on the route; extracting captured images corresponding to the plurality of the passing points from a database which stores the captured images in relation to corresponding image capturing locations respectively, wherein each of the image capturing locations is within a predetermined range from the each of the plurality of the passing points; displaying a map image representing the route on an electric display based on the route information; and displaying the extracted captured images with the map image sequentially in an order from a first captured image corresponding to a first passing point closest to the starting point to a second captured image corresponding to a second passing point closest to the destination.

It should be noted that general or specific embodiments may be implemented as a system, a method, an integrated circuit, a computer program, a storage medium, or any selective combination thereof.

The present disclosure makes it possible for a user to recognize the current road condition or traffic condition before the user actually starts travelling. This allows the user to select a proper route. Furthermore, in a case where the user is going to travel the route for the first time, the user is allowed to virtually travel along the route by watching the images before the user actually starts the travel. This allows the user to get to know what the route looks like, which makes it possible to reduce an uneasy feeling of the user.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 is a diagram illustrating a configuration of a route display system according to an embodiment;

FIG. 2 is a diagram illustrating a configuration of a server apparatus according to an embodiment;

FIG. 3 is a diagram illustrating an example of image management information stored in an image storage unit according to an embodiment;

FIG. 8A is a diagram illustrating an example of an overall service provided by a route display system according to an embodiment;

FIG. 11 is a diagram illustrating another example of image management information stored in image storage unit according to an embodiment;

FIG. 14 is a diagram illustrating an example of a captured image in which a vehicle is deleted.

DETAILED DESCRIPTION

Figure 4:
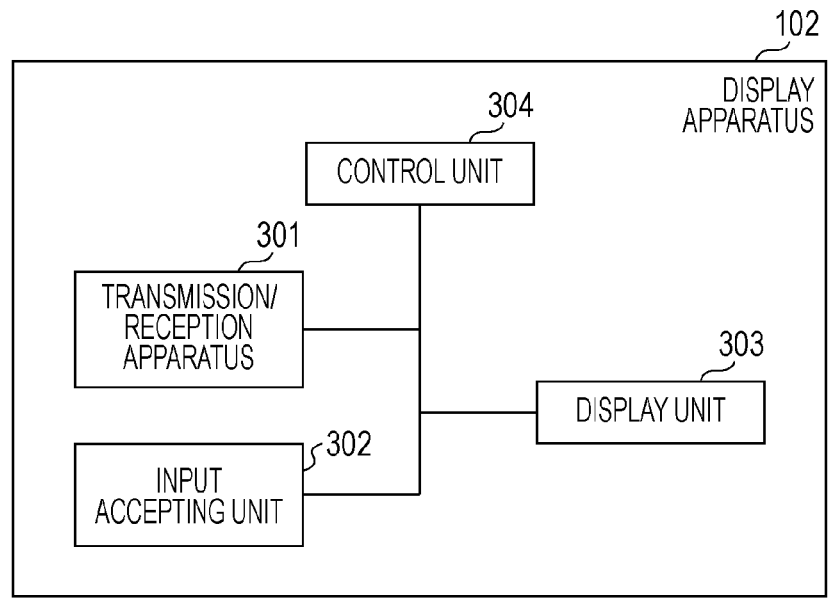
FIG. 4 is a diagram illustrating a configuration of a display apparatus according to an embodiment.

Underlying Knowledge Forming Basis of the Present Disclosure

Japanese Patent No. 3988683 discloses a technique in which an in-vehicle device installed on a vehicle always grasps the current location of the vehicle and captures an image of an intersection using a camera according to a request from a server and information on the current location of the vehicle and transmits the captured image to the server. Furthermore, based on the information on the current location, the in-vehicle device requests the server to provide an image of an intersection located ahead of the car, and displays the received image on a display.

Japanese Unexamined Patent Application Publication No. 2006-337154 discloses an image display apparatus in which, before going to a location specified on a map in a specified direction, which is to trigger an image to be displayed, an image related to the specified location and the specified direction, which was captured and stored in the past, is displayed on a screen.

However, in the techniques disclosed in Japanese Patent No. 3988683 and Japanese Unexamined Patent Application Publication No. 2006-337154, it is not allowed for a user to recognize current road conditions or traffic conditions on routes from a starting point to a destination specified by the user to select a proper one of the routes. Furthermore, it is not allowed for the user to virtually travel along the route the user is going to travel for the first time by watching images before the user actually starts to travel, which would allow the user to get to know what the route looks like and which would reduce an uneasy feeling of the user.

To handle the situation described above, the present inventors have proposed herein techniques described below.

(1) According to an aspect, the present disclosure provides a route display method for display on a terminal apparatus comprising: acquiring i) starting point information indicating a starting point and ii) destination information indicating a destination; generating route information indicating a route from the starting point to the destination, wherein the route is searched based on the starting point information and the destination information, and the route information includes a plurality of passing points on the route; extracting captured images corresponding to the plurality of the passing points from a database which stores the captured images in relation to corresponding image capturing locations respectively, wherein each of the image capturing locations is within a predetermined range from the each of the plurality of the passing points; displaying a map image representing the route on an electric display based on the route information; and displaying the extracted captured images with the map image sequentially in an order from a first captured image corresponding to a first passing points closest to the starting point to a second captured image corresponding to a second passing points closest to the destination.

In this technique, before the user starts to travel from the starting point to the destination, the map image representing the route from the starting point to the destination is displayed based on the route information and furthermore captured images corresponding to respective passing points on the route are displayed. Thus the user is allowed to recognize the current road condition or traffic condition before the user starts to travel, which makes it possible for the user to select a proper route. Furthermore, in a case where the user is going to travel the route for the first time, the user is allowed to virtually travel along the route by watching the images before the user starts actually travel. This allows the user to get to know what the route looks like, which makes it possible to reduce an uneasy feeling of the user.

(2) In the aspect, the route display method may further include, displaying on the map image a marker so as to move along the route from the starting point displayed on the map image to the destination displayed on the map image and sequentially displaying the extracted captured images in synchronization with the movement of the marker. (3) In the aspect, the extracted captured images may be displayed before a user of the terminal apparatus starts to move. These make it possible for the user to confirm the current road conditions or the traffic conditions in advance and thus the user can select an appropriate route. These make it possible user to simulate moving with checking the images of the route which the user passes for the first time in advance and thus the anxiety for the route which the user passes for the first time can be wiped.

(4) In the aspect, at least one of the starting point information and the destination information may be acquired by an input device via an operation of the user of the terminal apparatus. This makes it possible for the user to set at least one of the starting point information and the destination information.

(5) In the aspect, at least one of the starting point information and the destination information may be acquired by a communication circuit via a network. This makes it possible to set at least one of the starting point information and the destination information based on information acquired via the network.

(6) In the aspect, the route is searched at a server to which the terminal apparatus is connectable.

(7) In the aspect, the starting point information may be acquired by determining the starting point information based on i) pre-stored location information indicating a predetermined location related to a user of the terminal apparatus or ii) current location information indicating a current location of the user of the terminal apparatus; and the destination information is acquired by predicting the destination information based on behavior history information of the user, the behavior history information indicating locations the user has visited in the past. (8) In the aspect, the predetermined location indicates a house in which a user of the terminal apparatus lives.

Thus, the starting point information is determined based on the location information stored in advance or based on the current location information indicating the current location of the user, and the destination information is predicted based on the behavior history of the user, and thus the user does not need to input the starting point information or the destination information, which results in an improvement in convenience for the user.

(9) In the aspect, the database may store a plurality of captured images in relation to one of the image capturing locations, each of the plurality of the captured images in relation to the one of the image capturing locations may have a corresponding image capturing date/time, and the method may further including: extracting one captured image which has the latest image capturing date/time, among the plurality of the captured images in relation to the one of the image capturing locations within the predetermined range from one of the plurality of the passing points.

Thus a captured image with a latest image capturing date/time is extracted from one or more images captured at one or more image capturing locations in an area within a predetermined range, and thus the user is allowed to recognize a latest road condition.

(10) In the aspect, the route display method may further include displaying on the map image a first marker for the starting point, a second marker for the first location, a third marker for the destination, and a fourth marker for the second location, the first marker, the second marker, the third marker, and the fourth marker being different from each other.

This allows the user to confirm the locations of the starting point, the virtual starting point, the destination, and the virtual destination.

(11) In the aspect, the database may store each of the captured images in relation to at least one of i) an image capturing date/time of a corresponding captured image, ii) weather under which the corresponding captured image was captured, and iii) a vehicle type of a vehicle on which a camera that captures the corresponding captured image is installed.

This makes it possible to extract captured images that satisfy at least one of conditions in terms of the image capturing date/time, the image capturing location, the weather as of the image capturing date/time, and the vehicle type of the vehicle on which the camera that captures the captured image is installed, specified by the user, and thus it becomes possible to display captured images requested by the user.

(12) In the aspect, the route display method may further include, in a case where the database does not store corresponding captured images in relation to corresponding image capturing locations within the predetermined range from one of the plurality of the passing points, displaying an image indicating that there is no the corresponding captured images in relation to the corresponding image capturing locations within the predetermined range from the one of the plurality of the passing points.

Thus in the case where there is no captured image captured at a location exactly the same as or close to a passing point, an image is displayed to indicate that there is no image to notify the user that there is no image.

(13) In the aspect, a third captured image corresponding to a third passing points of the plurality of the passing points may be displayed at a first time, and a fourth captured image corresponding to a fourth passing point adjacent to the third passing point is displayed at a second time, and a time interval between the first time and the second time may correspond to a distance between the third passing point and the fourth passing point.

When the distance between two adjacent ones of the passing points on the route is large, it is allowed to increase the time interval between timings of displaying two corresponding captured images. On the other hand, when the distance between two adjacent ones of the passing points on the route is small, it is allowed to reduce the time interval between timings of displaying two corresponding captured images.

(14) In the aspect, the route may include a plurality of sections, and the number of the plurality of the passing points per unit distance extracted in a predetermined section may be different from the number of the plurality of the passing points per unit distance extracted in each of sections other than the predetermined section.

This allows it to display a greater number captured images in response to an increase in the number of passing points in a section, which allows the user to watch the greater number of captured images.

(15) In the aspect, the predetermined section may satisfy a predetermined condition.

This allows it to display a greater number captured images in response to an increase in the number of passing points in a section satisfying a certain condition, which allows the user to watch the greater number of captured images.

(16) In the aspect, the route may pass over a plurality of areas, and the number of the plurality of the passing points per unit area extracted in an area within a predetermined range from a predetermined location may be different from the number of the plurality of the passing points per unit area extracted in each of areas other than the area within the predetermined range from the predetermined location.

This allows it to display a greater number captured images in response to an increase in the number of passing points in an area, which allows the user to watch the greater number of captured images.

(17) In the aspect, the area within the predetermined range from the predetermined location may satisfy a predetermined condition.

This allows it to display a greater number captured images in response to an increase in the number of passing points in an area satisfying a condition, which allows the user to watch the greater number of captured images.

(18) In the aspect, the route display method further include, in a case where it is determined that the simulation marker is moved to a selected location on the route, displaying a fifth captured image representing a fifth passing point closest to the selected location.

By displaying a captured image corresponding to an image capturing location closest to the location of the marker on the map specified by the user, it becomes possible for the user to watch a captured image at an arbitrary location on the map.

(19) In the aspect, wherein the database stores a plurality of captured images in relation to a corresponding image capturing location and to a corresponding image capturing date/time, and wherein the method may further include: in a case where it is determined that a user of the terminal apparatus specifies an arbitrary location on the map image, extracting from the database a plurality of the captured images that were captured at different times at an image capturing location corresponding to the specified arbitrary location; and displaying the plurality of the extracted captured images sequentially in an order from the latest image capturing date/time in relation to the plurality of the extracted captured images.

By displaying a plurality of images captured at an arbitrary location on the map image specified by a user in the order of time stating with the latest captured image, it becomes possible for the user to recognize a change in the past road condition.

(20) In the aspect, the route information may include latitude information and longitude information of each of passing points. (21) In the aspect, the starting point information may include latitude information and longitude information of the starting point, and the destination information may include latitude information and longitude information of the destination.

These make it possible to accurately describe the passing points, the starting point and the destination.

(22) According to another aspect, the present disclosure provides a method of generating database, including: acquiring from a camera installed on a moving vehicle, a captured image that is captured, in a forward moving direction, by the camera; acquiring from the camera, an image capturing date/time corresponding to the captured image; acquiring from the camera, location information indicating an image capturing location corresponding to the captured image; calculating an image capture direction corresponding to the captured image, based on i) the location information corresponding to the captured image and ii) location information corresponding to one of two other captured images that are captured before and after the captured image; and storing the acquired captured image, the acquired image capturing date/time, the acquired location information, and the calculated image capture direction, in relation to each other, in the database.

This method makes it possible to, using the database in which captured images are stored in relation to the image capturing date/time, the location information, and the image capture direction, extract a plurality of captured images corresponding exactly or closely to the respective passing points from the image storage unit. Furthermore, in a case where the user is going to travel the route for the first time, the user is allowed to virtually travel along the route by watching the images before the user actually starts the travel. This allows the user to get to know what the route looks like, which makes it possible to reduce an uneasy feeling of the user.

Embodiments of the present disclosure are described below with reference to accompanying drawing. Note that the embodiments described below are merely examples, and the present disclosure is not limited to those embodiments.

1.1 Configuration of Route Display System

FIG. 1 is a diagram illustrating a configuration of a route display system according to the present embodiment. In the present embodiment, the route display system includes, as illustrated in FIG. 1, a server apparatus 101 and a display apparatus 102. The server apparatus 101 includes an image database (an image storage unit 202 described later).

The server apparatus 101 receives starting point information associated with a starting point and destination information associated with destination. The server apparatus 101 searches for a route from the starting point to the destination based on the starting point information and the destination information, and extracts, as route information, a set of a plurality of passing points on the retrieved route. The server apparatus 101 retrieves a plurality of images captured at image capturing locations corresponding exactly or closely to the respective passing points from image database in which a plurality of captured images captured at a plurality of image capturing locations are stored in relation to locations of the respective image capturing locations on a map.

The image database manages images captured by in-vehicle cameras of a plurality of users or by a camera installed on a drive recorder or on a smartphone or the like and also images captured by infrastructure devices such as street cameras in relation to image capturing date/time, image capturing locations (for example, latitudes and longitudes), and traveling directions (image capture directions), and/or the like. A method of capturing images using various types of cameras and a method of uploading the captured images to the server apparatus 101 will be described later.

The display apparatus 102 is connected to the server apparatus 101 via the network 104 such that communication is allowed between the display apparatus 102 and the server apparatus 101. The display apparatus 102 transmits the starting point information and the destination information to the server apparatus 101. The server apparatus 101 calculates the route from the starting point to the destination based on the received starting point information and the destination information. The server apparatus 101 also retrieves captured images related to the plurality of passing points on the route. The server apparatus 101 transmits the route information indicating the calculated route and the retrieved captured image to the display apparatus 102.

1.2 Configuration of Server Apparatus 101

Next, the configuration of the server apparatus 101 is described in detail below.

FIG. 2 is a diagram illustrating a configuration of the server apparatus according to the present embodiment. The server apparatus 101 includes, as illustrated in FIG. 2, a transmission/reception unit 201, an image storage unit 202, a route search unit 203, an image search unit 204, and a control unit 205.

The server apparatus 101 also includes, although not shown in the figure, a microprocessor, a random access memory (RAM), a read only memory (ROM), a hard disk, and the like. In the RAM, the ROM, or the hard disk, a computer program is stored, and the microprocessor operates according to the computer program so as to realize functions of the server apparatus 101.

In the server apparatus 101, functional blocks such as the transmission/reception unit 201, the image storage unit 202, the route search unit 203, the image search unit 204, the control unit 205, and/or the like may be typically realized by an integrated circuit such as a large scale integration (LSI). Each of the functional blocks may be formed individually on one chip, or two or more functional blocks may be formed on one chip. Note that part of one or more functional blocks may be formed on one chip.

The form of the integrated circuit is not limited to the LSI, but various other types of integrated circuits such as a system LSI, a super LSI, an ultra LSI, and the like may be employed.

Furthermore, the integrated circuit is not limited to the LSI, but the integrated circuit may be realized in the form of a dedicated circuit, a general-purpose processor, or the like. The integrated circuit may also be realized using a field programmable gate array (FPGA) LSI that is allowed to be programmed after the production of the LSI is completed, or a reconfigurable processor that is allowed to be reconfigured in terms of the connection or the setting of circuit cells in the inside of the LSI after the production of the LSI is completed.

When a new integration circuit technique other than LSI techniques are realized in the future by an advance in semiconductor technology or related technology, the functional blocks may be realized using such a new technique. A possible example of a new technique is biotechnology that may be used instead of the LSI based on the current technique.

Note that one or more of the functional blocks may be realized by software or a combination of software and hardware such as an LSI. The software may be configured to be tamper resistant.

(1) Transmission/Reception Unit 201

The transmission/reception unit 201 receives the starting point information associated with the starting point and the destination information associated with the destination, accepted by the display apparatus 102 and transmitted from the display apparatus 102. The transmission/reception unit 201 acquires the starting point information associated with the starting point and the destination information associated with the destination. The starting point information and the destination information each may be represented, for example, by an address, a name of a building, a latitude, a longitude, and/or the like. The starting point information may be directly input by a user. Alternatively, the starting point information may be given by location information of a user's home stored in advance in the display apparatus 102 or may be given by current location information acquired from a global positioning system (GPS) disposed in the display apparatus 102. The destination information may be predicted based on a behavior history of a user. A destination such as a workplace, school, a supermarket, or the like may be predicted based on daily behavior history of the user, and the predicted destination may be automatically set as the destination.

The transmission/reception unit 201 transmits, to the display apparatus 102, the route information retrieved by the route search unit 203 described later and a plurality of captured images retrieved, on the route, by the image search unit 204 described later.

(2) Image Storage Unit 202

The image storage unit (database) 202 stores images and manages them, wherein the images may include an image captured by an in-vehicle camera, an image captured by a drive recorder, an image captured by a street camera, an image captured by a smartphone camera, a still image extracted from images associated with traffic information or road information, and/or the like. The image storage unit 202 stores the images such that a plurality of images captured at a plurality of image capturing locations are related to locations on a map of the respective image capturing locations. The image storage unit 202 may store the images such that the captured images, the locations of image capturing locations on the map, and the image capturing date/time are related to each other.

FIG. 3 is a diagram illustrating an example of image management information stored in the image storage unit 202 according to the present embodiment. In the example illustrated in FIG. 3, each still image (captured image) is managed with tag information indicating an image capturing date/time of the still image (captured image), location information (the latitude and the longitude) indicating the image capturing location, and a travelling direction (an image capture direction). For example, a still image with a file name "00231924.jpg" is an image captured at 19:16:21 on Jun. 3, 2014, at a location with a latitude "+34.750631" and a longitude "+135.579582", and in a travelling direction (image capture direction) of "45°".

Note that the location information is converted from coordinates in a sexagesimal expression (degrees, minutes, seconds) into decimal expression. The travelling direction (image capture direction) is defined such that the north is represented as 0°, the east is represented as 90°, the south is represented as 180°, and the west is represented as 270°, and the travelling directions (image capture directions) are represented in degrees. Note that in a case where a still image is extracted from a moving image, the travelling direction thereof may be calculated from the location information of the extracted still image and the location information of a frame immediately before or after the extract still image.

(3) Route Search Unit 203

The route search unit 203 searches for a route from a starting point to a destination based on the starting point information and the destination information and extracts, as route information, a set of a plurality of passing points on the route found in the search. In the searching, the route search unit 203 detects at least one route based on the starting point information and the destination information received via the transmission/reception unit 201. Note that the route is a set of a plurality of passing points. The route information includes a latitude and a longitude indicating position coordinates of each passing point, and a travelling direction at each passing point defined for the case where the vehicle travels along the route from the starting point to the destination. Note that the travelling direction is represented in degrees when directions are defined such that the north is represented as 0°, the east is represented as 90°, the south is represented as 180°, and the west is represented as 270°.

(4) Image Search Unit 204

The image search unit 204 extracts a plurality of captured images corresponding exactly or closely to the respective passing points from the image storage unit 202. More specifically, the image search unit 204 searches the captured images stored in the image storage unit 202 using the location information (the latitude and the longitude) and the travelling direction (image capture direction) as search keys for each of the passing points retrieved by the route search unit 203. A search method employed by the image search unit 204 is to extract a captured image with a latest image capturing date/time from one or more captured images corresponding to one or more image capturing locations in an area within a predetermined range centered at each passing point. More specifically, for example, the image search unit 204 extracts a captured image with a latest image capturing date/time from one or more captured images corresponding to one or more image capturing locations located within an area with a radius of 5 meters centered at each passing point.

(5) Control Unit 205

The control unit 205 manages and controls the transmission/reception unit 201, the image storage unit 202, the route search unit 203, and the image search unit 204 so as to realize the functions of the server apparatus 101.

1.3 Configuration of Display Apparatus 102

Next, the configuration of the display apparatus 102 is described in detail below.

FIG. 4 is a diagram illustrating a configuration of the display apparatus according to the present embodiment. The display apparatus 102 includes, as illustrated in FIG. 4, a transmission/reception unit 301, an input accepting unit 302, a display unit 303, and a control unit 304. The display apparatus 102 may be, for example, a car navigation system, a smartphone, a portable telephone apparatus, a television set, a personal computer, a tablet computer, or the like.

The display apparatus 102 includes, although not shown in the figure, a microprocessor, a RAM, a ROM, a hard disk, and the like. A computer program is stored in the RAM, the ROM, and/or the hard disk, and the microprocessor operates according to the computer program so as to realize the functions of the display apparatus 102.

Each of the functional blocks such as the transmission/reception unit 301, the input accepting unit 302, the display unit 303, and the control unit 304 may be typically realized in the form of an integrated circuit such as an LSI. Each of the functional blocks may be formed individually on one chip, or two or more functional blocks may be formed on one chip. Note that part of one or more functional blocks may be formed on one chip.

Although in the above description, the term "LSI" is used, it is also called an IC, a system LSI, a super LSI, or an ultra LSI depending on the integration density.

Furthermore, the integrated circuit is not limited to the LSI, but the integrated circuit may be realized in the form of a dedicated circuit, a general-purpose processor, or the like. The integrated circuit may also be realized using a field programmable gate array (FPGA) LSI that is allowed to be programmed after the production of the LSI is completed, or a reconfigurable processor that is allowed to be reconfigured in terms of the connection or the setting of circuit cells in the inside of the LSI after the production of the LSI is completed.

As a matter of course, if a progress of a semiconductor technology or another technology derived therefrom provides a new technology for realizing an integrated circuit which can replace the LSI, functional blocks may be integrated using the new technology. A possible example of a new technique is biotechnology that may be used instead of the LSI based on the current technique.

Note that one or more of the functional blocks may be realized by software or a combination of software and hardware such as an LSI. The software may be configured to be tamper resistant.

(1) Transmission/Reception Unit 301

The transmission/reception unit 301 transmits, to the server apparatus 101, starting point information and destination information accepted by the input accepting unit 302. The starting point information and the destination information each may be represented, for example, by an address, a name of a building, a latitude, a longitude, and/or the like. The starting point information may be directly input by a user, or may be given by location information of a user's home stored in advance in the display apparatus 102 or may be given by current location information acquired from a global positioning system (GPS) disposed in the display apparatus 102. The destination information may be predicted based on a behavior history of a user. A destination such as a workplace, school, a supermarket, or the like may be predicted based on daily behavior history of the user, and the predicted destination may be automatically set as the destination.

The transmission/reception unit 301 receives, from the server apparatus 101, the route information retrieved by the server apparatus 101 and a plurality of captured images retrieved, on the route, by the server apparatus 101.

(2) Input Accepting Unit 302

The input accepting unit 302 accepts at least one of the starting point information and the destination information input by a user. The input accepting unit 302 also accepts an operation command associated with the display apparatus 102 such as a display command to display a captured image, a play command to play a captured image, or the like.

(3) Display Unit 303

Before a user starts to travel toward the destination, the display unit 303 displays a map image representing the route from the starting point to the destination based on the route information and displays the extracted captured images sequentially in synchronization with the virtual moving from the starting point to the destination along the route. The display unit 303 displays the route from the starting point to the destination on the map image on the screen based on the route information received via the transmission/reception unit 301 and also displays a marker to indicate arbitrary location information on the route. Furthermore, the display unit 303 sequentially displays the captured images received via the transmission/reception unit 301.

Figure 5:
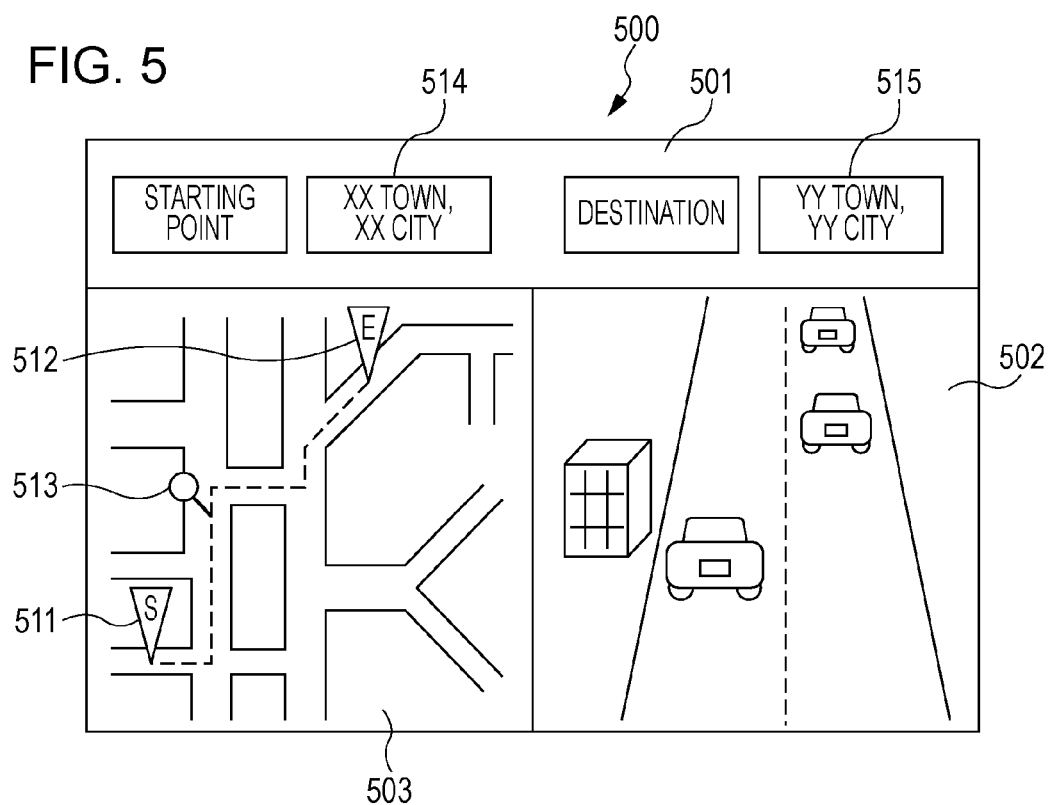
FIG. 5 is a diagram illustrating an example of a display screen according to an embodiment.

FIG. 5 is a diagram illustrating an example of a display screen according to the present embodiment. In the example illustrated in FIG. 5, the display screen 500 includes a first display area 501, a second display area 502, and a third display area 503. In the first display area 501, starting point information 514 and destination information 515 are displayed. In the second display area 502, images captured at particular passing points on a route are displayed. In the third display area 503, a map image is displayed, which includes a starting point marker 511 indicating a starting point, a destination marker 512 indicating a destination, and a passing point marker 513 that moves on the route from the starting point to the destination. The passing point marker 513 indicates a passing point that is on the route on the map image and that corresponds to the captured image displayed in the second display area 502.

In a case where a user issues a play command by pressing a play button (not illustrated) and the input accepting unit 302 accepts this inputting of the play command, the display unit 303 displays the passing point marker 513 indicating the passing point such that the passing point marker 513 moves along the route from a passing point closest to the starting point toward a passing point closest to the destination and sequentially displays, in the second display area 502, captured images related to the passing points indicated by the passing point marker 513.

By sequentially displaying the captured images related to the passing points from the starting point to the destination in the above-described manner, it becomes possible for a user to watch the images captured actually, which allows the user to visually recognize a road condition or a traffic condition on the route from the starting point to the destination. Note that this visual recognition is possible in a fast-forward play mode.

In the present embodiment, in a case where a value is predetermined as to the play time in which it is allowed to play a plurality of captured images from the starting point to the destination, the display unit 303 may change a play speed depending on the distance from the starting point to the destination. In this case, for example, when the distance of a first route is greater than the distance of a second route, the play speed to play a plurality of captured images of the first route is faster than the play speed to play a plurality of captured images of the second route.

The play time allowed to play a plurality of captured images may be set by a user. Furthermore, the play speed to which to play a plurality of captured images may be set by a user.

(4) Control Unit 304

The control unit 304 manages and controls the transmission/reception unit 301, the input accepting unit 302, and the display unit 303 so as to realize the functions of the display apparatus 102.

The control unit 304 may determine the starting point information based on the location information stored in advance or the user's current location information. The control unit 304 may predict the destination information based on the user's behavior history.

1.4 Operation of Route Display System

An example of an operation of the route display system is described below with reference to FIG. 6 and FIG. 7 for a case in which the display apparatus 102 is connected to the network 104, and the display apparatus 102 receives route information and a plurality of captured images from the server apparatus 101 and displays a map image and the plurality of captured images.

Figure 6:
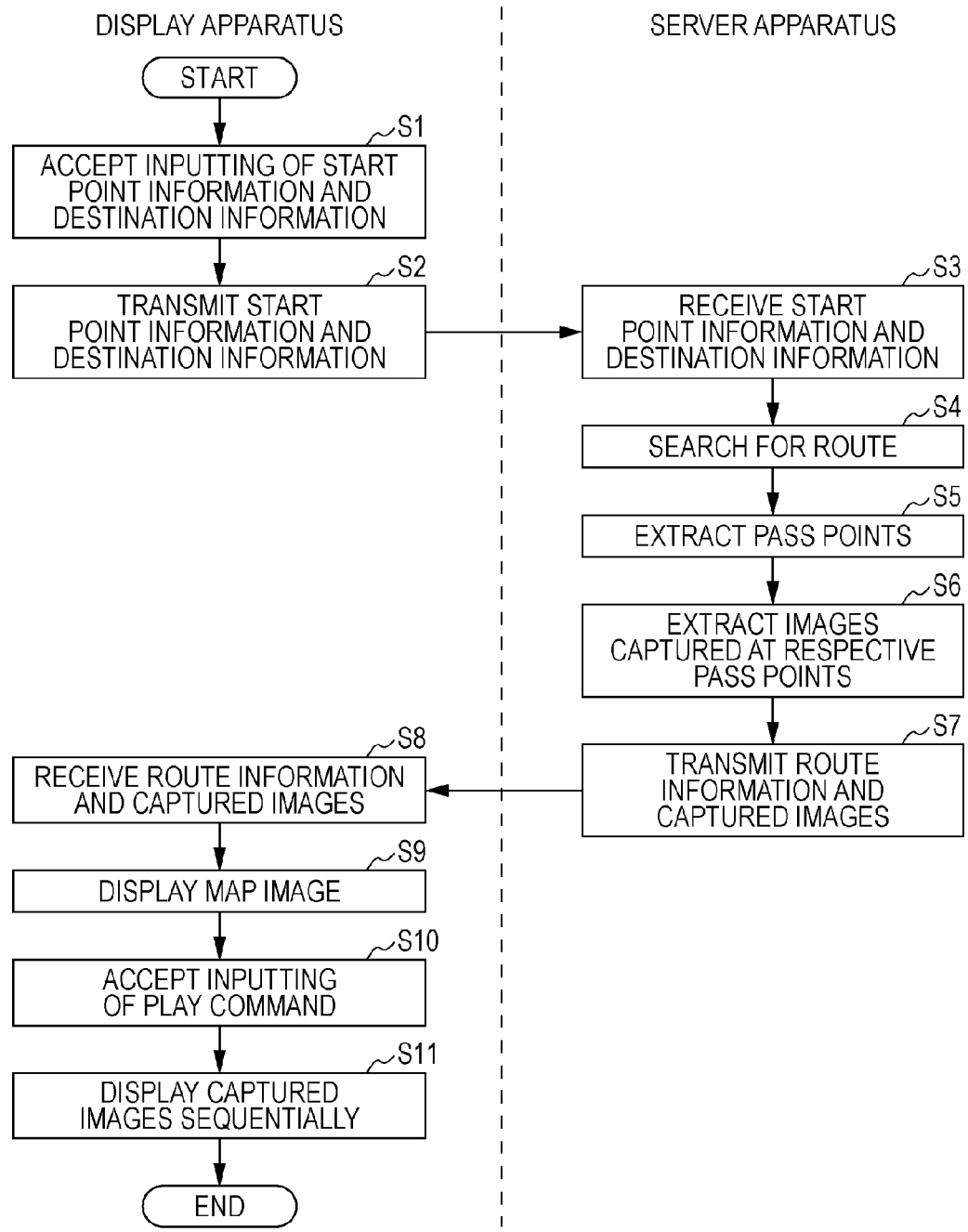
FIG. 6 is a flow chart illustrating an example of an operation of a route display system according to an embodiment.
Figure 7:
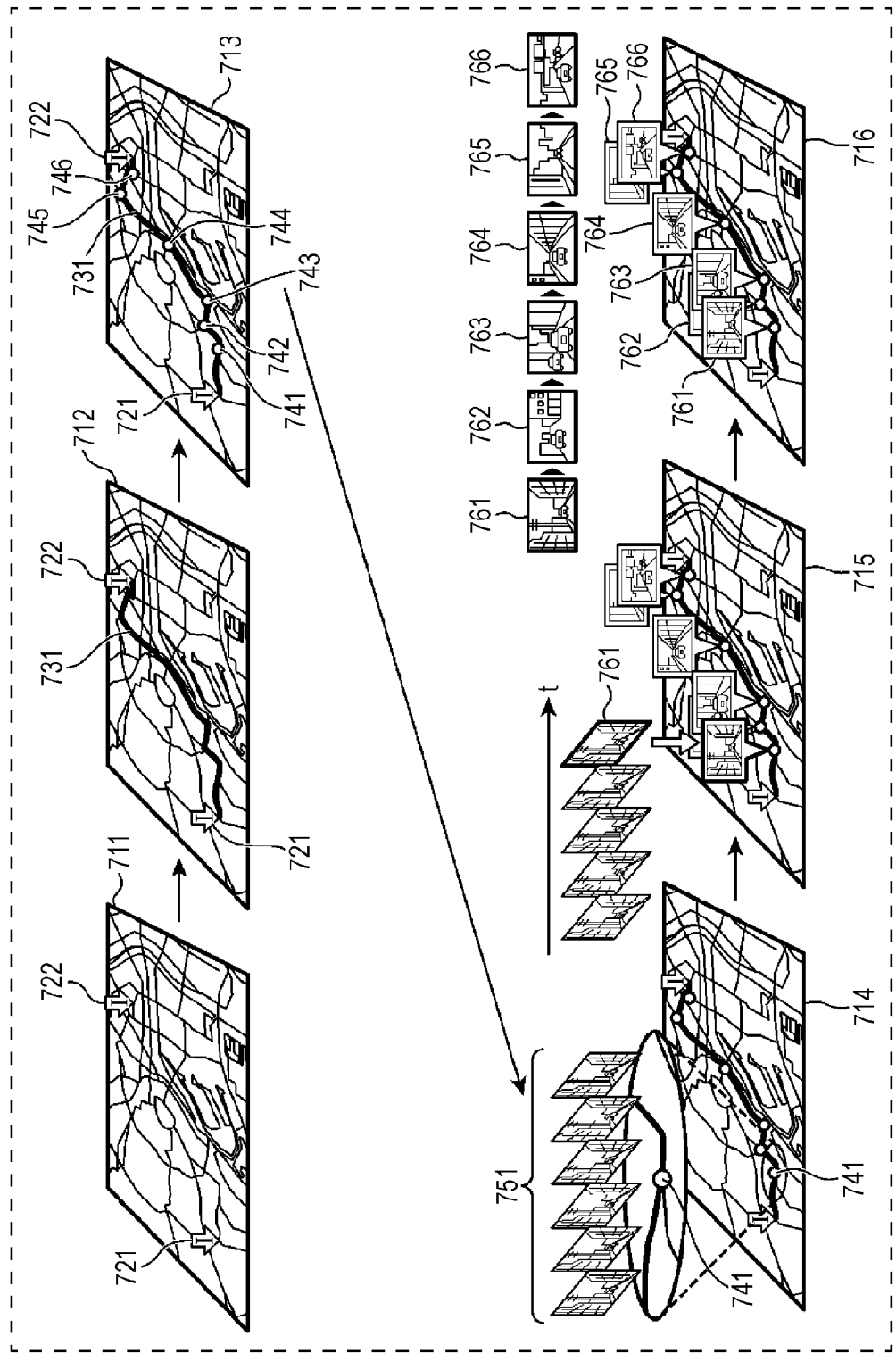
FIG. 7 is a schematic diagram for illustrating an operation of a route display system according to an embodiment.

FIG. 6 is a flow chart illustrating the example of the operation of the route display system according to the present embodiment, and FIG. 7 is a schematic diagram for use in illustrating the operation of the route display system according to the present embodiment.

First, the input accepting unit 302 of the display apparatus 102 accepts inputting by a user in terms of starting point information and destination information (step S1). For example, as illustrated on a map 711 in FIG. 7, the input accepting unit 302 may display a map image on the display unit 303 and may accept inputting of a starting point 721 and a destination 722 on the map image. Alternatively, without displaying a map image, the input accepting unit 302 may accept inputting of characters indicating an address or a facility name thereby accepting inputting f the starting point 721 and the destination 722.

Next, the transmission/reception unit 301 transmits, to the server apparatus 101, the starting point information and the destination information accepted by the input accepting unit 302 (step S2).

Next, the transmission/reception unit 201 of the server apparatus 101 receives the starting point information and the destination information transmitted from the display apparatus 102 (step S3).

Next, the route search unit 203 searches for a route from the starting point to the destination based on the starting point information and the destination information received via the transmission/reception unit 201 (step S4). For example, as illustrated on a map 712 in FIG. 7, the route search unit 203 searches for a route 731 from the starting point 721 and the destination 722. The searching for the route may be performed according to a generally known technique, and thus a further detailed description thereof is omitted.

Next, the route search unit 203 extracts, as route information, information (represented in latitude, longitude, and travelling direction) associated with a plurality of passing points on the retrieved route (step S5). For example, as illustrated on a map 713 in FIG. 7, the route search unit 203 extracts a plurality of passing points 741 to 746 on the retrieved route 731. Note that the passing points may be extracted at predetermined intervals such as every 30 meters. Alternatively, the route search unit 203 may determine in advance the number of passing points to be extracted and may divide the route at as many division points as the number of passing points, and the route search unit 203 may employ the resultant division points as the passing points. In this case, the predetermined number of passing points may be changed depending on the play time to play the captured images. For example, when the given play time is long, the number of passing points may be set to be large. On the other hand, when the given play time is short, the number of passing points may be set to be small.

Next, the image search unit 204 searches the plurality of captured images stored in the image storage unit 202 using, as search keys, the latitude, the longitude, and the travelling direction (the image capture direction) at each of one or more pieces of passing points information extracted by the route search unit 203 to detect and extract a captured image at an image capturing location exactly or closely corresponding to each passing point (step S6). In this search process, the image search unit 204 performs the captured image extraction sequentially for each of the passing points in the order from the passing point closest to the starting point to the passing point closest to the destination such that a captured image with a latest image capturing date/time is extracted from one or more images captured at one or more image capturing locations located within an area with a predetermined diameter (for example, 5 meters) centered at each passing point. Note that the image search unit 204 relates the extracted captured images to the corresponding passing points.

For example, as illustrated on a map 714 in FIG. 7, the image search unit 204 retrieves images captured at image capturing locations exactly identical or close to a passing point 741 from the plurality of captured images stored in the image storage unit 202. In the example illustrated in FIG. 7, six captured images 751 are extracted as candidates for a captured image at the passing point 741. After that, as illustrated on a map 715 in FIG. 7, the image search unit 204 extracts a captured image 761 with a latest image capturing date/time from the six captured images 751. This makes it possible for a user to recognize a latest road condition. Thereafter, the image search unit 204 extracts captured images in a similar manner for respective other passing points 742 to 746.

Alternatively, the image search unit 204 may detect an image capturing location closest to a passing point among one or more image capturing locations located within an area with a predetermined radius (for example, 5 meters) centered at the passing point, and the image search unit 204 may extract a captured image with a latest image capturing date/time from one or more images captured at the detected image capturing location.

Next, the transmission/reception unit 201 transmits the route information and the captured images extracted by the route search unit 203, that is, the route information (the set of passing points information) and the plurality of captured images related to the location information to the display apparatus 102 (step S7).

Next, the transmission/reception unit 301 of the display apparatus 102 receives the route information and the plurality of captured images transmitted from the server apparatus 101 (step S8).

Next, the display unit 303 displays a map image representing the route from the starting point to the destination based on the route information received via the transmission/reception unit 301 (step S9).

Next, the input accepting unit 302 accepts inputting by a user in terms of a play command to start displaying the captured images on the route (step S10).

Next, the display unit 303 displays a passing point marker indicating the passing point while moving the passing point marker along the route from the location information closest to the starting point toward the passing point closest to the destination and the display unit 303 also displays the captured image related to the passing point indicated by the passing point marker sequentially from one passing point to another (step S11).

For example, as illustrated on a map 716 in FIG. 7, the display unit 303 sequentially displays captured images 761 to 766 extracted for respective passing points 741 to 746.

Note that, in the present embodiment, the images captured at the respective passing points are not displayed when a user passes through the respective passing points in the course of traveling. In the present embodiment, on the contrary, before a user starts to travel toward the destination, the images captured on the route from the starting point to the destination are sequentially displayed. This makes it possible for the user to recognize the actual road condition or traffic condition while virtually moving along the route from the starting point to the destination. Thus the user is allowed to recognize the current road condition or traffic condition before the user starts to travel, and thus the user is allowed to select a proper route. Furthermore, in a case where the user is going to travel along the route for the first time, the user is allowed to virtually travel along the route before starting the actual travel to get to know what the route looks like, which makes it possible to reduce an uneasy feeling of the user.

1.5 Overall Image of System

Figure 8B:
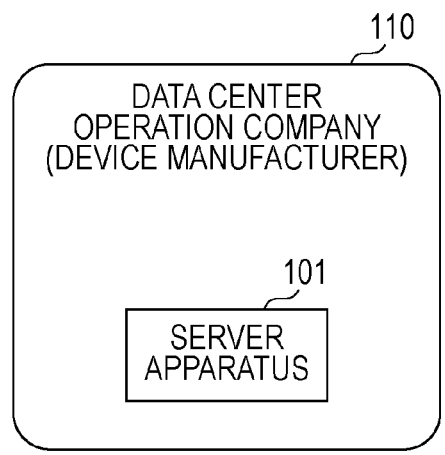
FIG. 8B is a diagram illustrating an example in which a device manufacturer is a data center operation company.
Figure 8C:
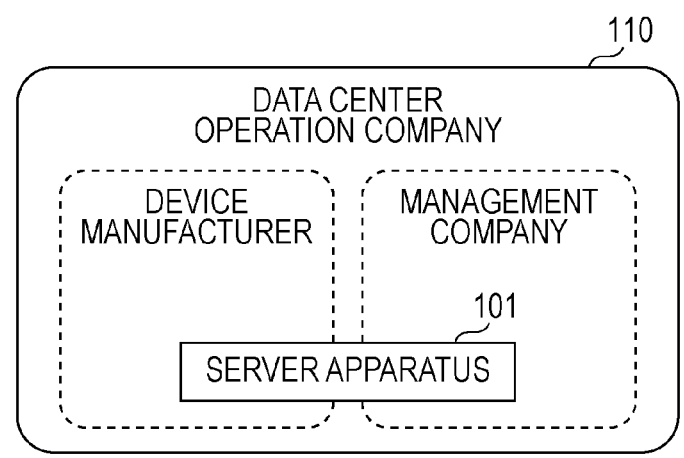
FIG. 8C is a diagram illustrating an example in which one of or both of a device manufacturer and a management company are data center operation companies.

FIG. 8A is a diagram illustrating an example of an overall service provided by the route display system according to the present embodiment, FIG. 8B is a diagram illustrating an example in which a device manufacturer is a data center operation company, and FIG. 8C is a diagram illustrating an example in which one of or both of a device manufacturer and a management company are data center operation companies. The route display system includes a group 100, a data center operation company 110, and a service provider 120.

The group 100 includes, for example, companies, organizations, and/or homes, with arbitrary scales. The group 100 includes a plurality of display apparatus 102 and communication apparatuses 103. The plurality of display apparatuses 102 may include a device (such as a smartphone, personal computer (PC), a TV set, a car navigation system equipped with a communication module, or the like) directly connectable to the Internet, and a device (such as a car navigation system equipped with no communication module, or the like) that is not capable of directly connecting to the Internet. In a case where one or more of the display apparatuses 102 are such devices incapable of directly connecting to the Internet, they may be capable of connecting to the Internet via one or more of the communication apparatuses 103. Users 10 use the plurality f display apparatuses 102 in the group 100.

The data center operation company 110 includes a server apparatus 101. The server apparatus 101 is a virtual server that cooperates with various devices via the Internet. The main role of the server apparatus 101 is to manage big data or the like that is difficult to deal with by an average database management tool or the like. The data center operation company 110 manages data, manages the server apparatus 101, and operates the data center that deals with the data and the server apparatus 101. The details of the role of the data center operation company 110 will be described later.

Note that the data center operation company 110 is not limited to a company that only manages data or operates the server apparatus 101. For example, in a case where a device manufacturer, which develops and produces one of the plurality of display apparatuses 102, also manages data or manages the server apparatus 101 the device manufacturer functions as the data center operation company 110 as illustrated in FIG. 8B. Furthermore, the number of data center operation companies 110 is not limited to one. For example, as illustrated in FIG. 8C, in a case where a device manufacturer and a management company cooperatively or collaboratively mange data or operate the server apparatus 101, both or one of the device manufacturer and the management company functions as the data center operation company 110.

The service provider 120 includes a server apparatus 121. Herein there is no restriction on the scale of the server apparatus 121, and for example, the server apparatus 121 may include a memory or the like in a personal computer. Note that the service provider 120 may not include the server apparatus 121.

Next, a flow of information in the service is described below.

First, the display apparatus 102 in the group 100 transmits the starting point information and the destination information to the server apparatus 101 in the data center operation company 110. The server apparatus 101 collects the starting point information and the destination information transmitted from the display apparatus 102 (as represented by an arrow 131 in FIG. 8A). Herein the starting point information and the destination information each may be represented, for example, by an address, a name of a building, a latitude, a longitude, and/or the like. The starting point information and the destination information may be provided directly from the plurality of display apparatuses 102 to the server apparatus 101 via the Internet. The starting point information and the destination information may be transmitted once from the plurality of display apparatuses 102 to the communication apparatus 103, and then the starting point information and the destination information may be provided to the server apparatus 101 from the communication apparatus 103.

Next, the server apparatus 101 of the data center operation company 110 provides the collected starting point information and destination information in fixed units to the service provider 120. Herein, the fixed unit may be a unit in which the data center operation company 110 is allowed to rearrange and provide the collected information to the service provider 120, or the fixed unit may a unit requested by the service provider 120. Although the unit is assumed to be fixed in the above example, the unit is not necessary to be fixed and the amount of information provided may be changed depending on the situation. The starting point information and the destination information are stored as required in the server apparatus 121 disposed in the service provider 120 (an arrow 132 in FIG. 8A).

The service provider 120 arranges the starting point information and the destination information so as to adapt to the service to be provided to a user and provides the arranged starting point information and the destination information to the user. The service may be provided to users 10 using the plurality of display apparatuses 102 or to external users 20. An example of a method of providing a service to users 10 or 20 is to directly provide the service to the users 10 or 20 from the service provider 120 (arrows 133 and 134 in FIG. 8A). A service may be provided to a user 10, for example, again via the server apparatus 101 of the data center operation company 110 (arrows 135 and 136 in FIG. 8A). The server apparatus 101 of the data center operation company 110 may arrange the starting point information and the destination information so as to adapt to the service to be provided to a user and may provide the arranged starting point information and destination information to the service provider 120.

In the example illustrated in FIG. 8A, the service provided by the service provider 120 is to search for a route from the starting point to the destination. The server apparatus 101 of the data center operation company 110 transmits the starting point information and the destination information to the server apparatus 121 of the service provider 120. The server apparatus 121 searches for a route from the starting point to the destination based on the starting point information and the destination information and transmits route information obtained as a result of the search to the server apparatus 101. The server apparatus 101 extracts as plurality of captured images based on the received route information. The server apparatus 101 then transmits the route information and the plurality of captured image to the display apparatus 102. Before a user 10 starts to travel from the starting point toward the destination, the display apparatus 102 displays a map image representing the route from the starting point to the destination based on the route information and displays the captured images sequentially in synchronization with the virtual moving from the starting point to the destination along the route.

Note that users 10 may be or may not be the same as users 20.

Next, a method of generating a database according to the present embodiment is described below.

Figure 9:
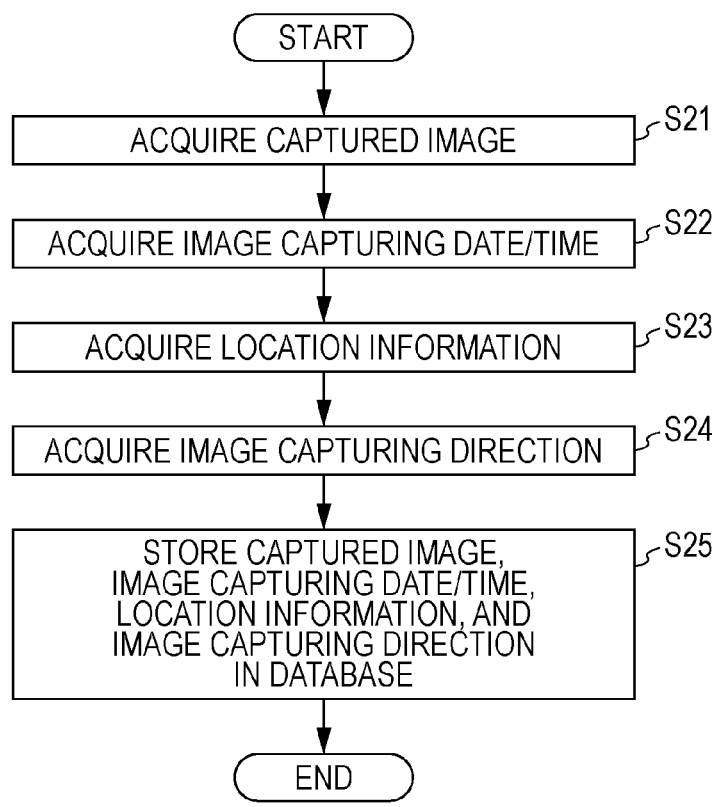
FIG. 9 is a flow chart illustrating a method of generating a database according to an embodiment.

FIG. 9 is a flow chart illustrating the method of generating the database according to the present embodiment.

First, the transmission/reception unit 201 acquires a captured image of a view seen in a forward moving direction of a moving camera (step S21). The camera may be, for example, an in-vehicle camera. The camera captures a moving image and extracts one still image, for example, every second from the captured moving image and transmits the extracted still images to the server apparatus 101. The transmission/reception unit 201 receives the captured image of a view seen in a forward moving direction of a camera transmitted from the camera.

Next, the transmission/reception unit 201 acquires the image capturing date/time of the captured image (step S22). More specifically, the camera transmits the image capturing date/time of the captured image (still image) to the server apparatus 101. The transmission/reception unit 201 receives the image capturing date/time of the captured image transmitted from the camera. Note that the captured image is attached with image identification information identifying the captured image, and the camera transmits the image identification information together with the image capturing date/time data.

Next, the transmission/reception unit 201 acquires the location information indicating the location where the captured image was captured (step S23). The camera has, for example, a GPS to acquire the location information indicating the current location, and transmits the location information (the latitude and the longitude) indicating the location where the captured image (the still image) is captured to the server apparatus 101. The transmission/reception unit 201 receives from the camera the location information indicating the location where the captured image is captured. Note that the captured image is attached with image identification information identifying the captured image, and the camera transmits the image identification information together with the location information.

Next, the transmission/reception unit 201 acquires the image capture direction of the captured image calculated based on the location information of the current captured image and the location information of one of two captured images temporally before or after the current captured image (step S24). The camera calculates the image capture direction for the present extracted captured image from the location information (the latitude and the longitude) about the current extracted captured-image and the location information on the previously extracted captured-image. That is, from the location information about the current extracted captured-image and the location information about the previously extracted captured-image, it is possible to calculate the direction of the movement of the camera. Thus, the camera transmits the direction of the movement of the camera as the image capture direction to the server apparatus 101. The transmission/reception unit 201 receives the image capture direction of the captured image transmitted from the camera. Note that the captured image is attached with image identification information identifying the captured image, and the camera transmits the image identification information together with the image capture direction data. The image capture direction is calculated by the camera in the present embodiment, but the present disclosure is not limited to this. For example, the image capture direction may be calculated by the server apparatus 101. In this case, the image capture direction may be calculated in a similar manner to that described above.

Next, the control unit 205 stores the acquired captured image, the image capturing date/time, the location information, and the image capture direction, in relation to each other, in the image storage unit 202 (the database).

Although in the present embodiment, the server apparatus 101 acquires the captured image the image capturing date/time, the location information, and the image capture direction separately, the present disclosure is not limited to this. For example, the server apparatus 101 may acquire all at the same time, or may two or three of the captured image, the image capturing date/time, the location information, and the image capture direction at the same time.

Modifications

Next, examples of modifications of the present disclosure are described below.

(1) The starting point and the ending point (the destination) of the route may be set by directly moving, on the map image, the markers (the starting point marker 511 and the destination marker 512 in FIG. 5) respectively indicating them. Alternatively, the starting point and the ending point (the destination) of the route may be set by inputting text data indicating an address, a name of a building, a telephone number, or the like, or may be set by choosing from options.

Alternatively, locations which are closest respectively to the starting point and the destination specified by a user and at which there exit captured images may be set as the starting point and the destination between which displaying of captured images is to be performed. In a case where the starting point and the destination specified by a user are different from the starting point and the destination for which captured images exits and between which the displaying of the captured image is to be performed, they may be indicated in different markers.

Figure 10:
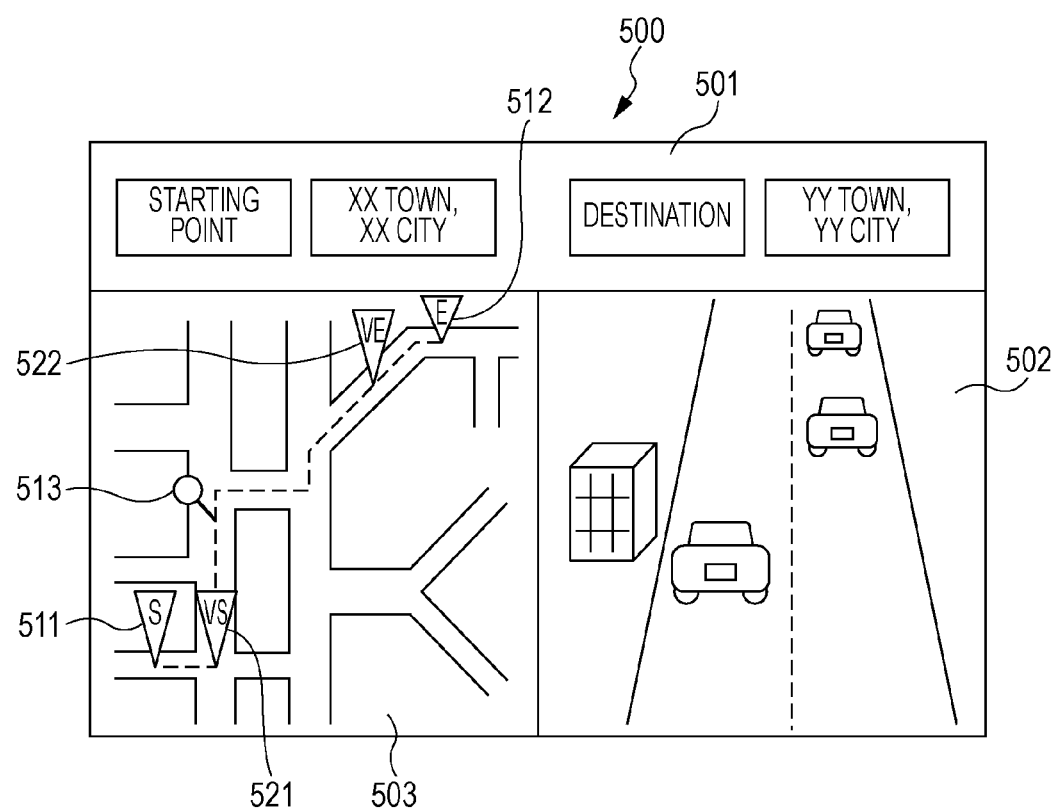
FIG. 10 is a diagram illustrating an example of a display screen which is displayed in a case where captured images corresponding to a starting point and a destination specified by a user do not exist.

FIG. 10 is a diagram illustrating an example of a display screen to be displayed for a case where there are no captured images corresponding to the starting point and the destination specified by a user. In the example illustrated in FIG. 10, the display screen 500 includes a first display area 501, a second display area 502, and a third display area 503.

In the third display area 503, as illustrated in FIG. 10, a starting point marker 511 indicating a starting point specified by a user and a destination marker 512 indicating a destination specified by the user are displayed.

In this situation, in a case where there is no captured image corresponding to the starting point in the image storage unit 202, the control unit 304 determines an image capturing location closest to the starting point as a virtual starting point. Furthermore, in a case where there is no captured image corresponding to the destination in the image storage unit 202, the control unit 304 determines an image capturing location closest to the destination as a virtual destination. The display unit 303 displays different markers on the map image so as to respectively indicate the starting point, the virtual starting point, the destination, and the virtual destination. In the third display area 503, as illustrated in FIG. 10, a virtual starting location marker 521 indicating an image capturing location closest to the starting point and a virtual destination marker 522 indicating an image capturing location closest to the destination are displayed.

For example, a character "S" is displayed on the starting point marker 511, a character "E" is displayed on the destination marker 512, a character "VS" is displayed on the virtual starting location marker 521, and a character "VE" is displayed on the virtual destination marker 522.

The starting point marker 511, the destination marker 512, the virtual starting location marker 521, and the virtual destination marker 522 may be displayed in different colors and/or in different shapes.

(2) The sizes of the second display area 502 and the third display area 503 illustrated in FIG. 5 and FIG. 10 may be variable. These sizes may be defined by a ratio to the size of the whole screen and may be displayed according to the defined ratio. The first display area 501, the second display area 502, and the third display area 503 may be independent display areas (with no overlap). Conversely, the first display area 501, the second display area 502, and the third display area 503 may overlap each other.

(3) In the embodiments described above, when captured images are searched for based on the route information (the plurality of pieces of passing points information) determined from the starting point and the destination, captured images with latest image capturing date/times are searched for. Alternatively, captured images may be searched for according to other search conditions.

For example, the image search unit 204 may accept a specification given by a user in terms of a time zone such as a day time or a night time, and may search for captured images in the specified time zone. In a case where retrieved captured images are a mixture of captured images in the day time and captured images in the night time, when the captured images are sequentially replayed, a change occurs between a day-time image and a night-time image, which may annoy a user. It is possible to handle the above situation by extracting only captured images in the day time or captured images in the night time such that when the captured images are sequentially replayed, no change occurs between a day-time image and a night-time image.

The image search unit 204 may accept a specification given by a user in terms of a day of the week, and may search for images captured on the specified day of the week. The image search unit 204 may accept a specification given by a user in terms of weather such as fine weather, rainy weather, or the like, and may search for captured images with specified weather. The image search unit 204 may accept a specification given by a user in terms of a day of the month such as 5th day of the month, 10th day of the month, or the like, and may search for images captured on the specified day of the month.

In a case where there are an ordinary road and an expressway extending in parallel at the same veridical heights or in a case where there are an ordinary road and an expressway extending in parallel at different vertical heights, the image search unit 204 may accept a specification given by a user in terms of a road type such as the ordinary road, the expressway, or the like, and may search for captured images with the specified road type. In a case where roads include a plurality of lanes, the image search unit 204 may accept a specification given by a user in terms of a lane such as a right lane, a left lane, a center lane, or the like, and may search for captured images with the specified lane.

FIG. 11 is a diagram illustrating another example of image management information stored in the image storage unit 202 according to the present embodiment. In the example illustrated in FIG. 11, metadata related each captured image additionally includes properties of weather, a road type, and traffic lane. The information about weather may be acquired such that location information indicating an image capturing location is transmitted to an external server that provides information about weather at a location indicated by the location information, and the information about weather is received from the external server. As for the information about the road type, it may be possible to determine from location information including height information whether a road of interest is an ordinary road or an expressway. Alternatively, as for the information about the road type, it may be possible to determine whether a road is an ordinary road or an expressway based on whether an electronic toll collection system (ETC) detects a passage through a tollgate of the expressway. As for the information about the lane, it may be possible to determine the lane type based on the location information including latitude/longitude information. Alternatively, as for the information about the lane, it may be possible to determine the lane type by recognizing the lane of interest using an image recognition technique.

The image management information may additionally include metadata about a vehicle type (ordinal vehicle, bus, truck, or the like) of a vehicle that captures a captured image. In this case, by adding an image capture height to the search condition, it is possible to retrieve and display images captured at the specified height. By specifying a vehicle type as one of search conditions, it is possible to extract captured images with the same image capture height, which makes it easier to watch images that are sequentially switched. Note that the metadata added to the image management information is not limited to those described above, but the metadata may include information about other properties of captured images, such as a traffic congestion level, a property of a location where many vehicles make a left or right turn.

As described above, the image search unit 204 may search the image storage unit 202 based on at least one of the image capturing date/time, the image capturing location, the weather as of the image capturing date/time, and the vehicle type of the vehicle on which the camera that captures the captured image is installed, to retrieve a plurality of captured images corresponding exactly or closely to the respective passing points.

The search condition may be specified by a user, or may be automatically set by the system depending on the past history or the like, or a combination thereof may be employed.

(4) When the display unit 303 displays the passing point marker indicating sequentially passing points along the route and also displays the captured images related to the respective passing points, the display unit 303 may change the speed of displaying the captured images (the speed of switching the displayed captured image). For example, when the distance between two adjacent ones of the passing points on the route is large, the display unit 303 may increase the time interval between timings of displaying two corresponding captured images. On the other hand, when the distance between two adjacent ones of the passing points on the route is small, the display unit 303 may reduce the time interval between timings of displaying two corresponding captured images.

When the display unit 303 displays the passing point marker indicating sequentially passing points along the route and also displays the captured images related to the respective passing points, the display unit 303 may increase the number of passing points in a particular section or a particular area so as to increase the number of passing points per unit distance and increase the number of captured images displayed. The route search unit 203 may increase or reduce the number of passing points extracted in a predetermined section, in a section satisfying a predetermined condition, an area around a predetermined location, or an area around a location satisfying a predetermined condition, compared with the number of passing points extracted in other sections or areas.

Figure 12:
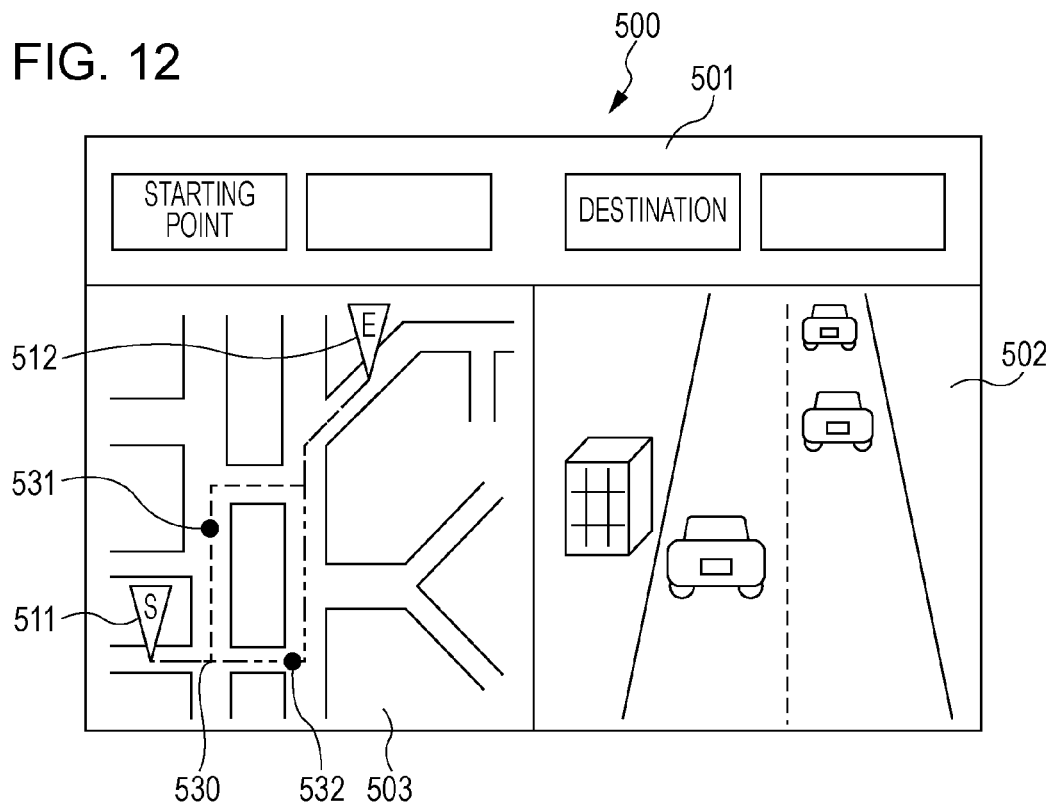
FIG. 12 is a diagram illustrating an example of a display screen which is displayed in a case where a plurality of routes are found in search.

FIG. 12 is a diagram illustrating an example of a display screen which is displayed in a case where a plurality of routes are found in search. The route search unit 203 may search for a plurality of routes from the starting point to the destination. For example, as in the example illustrated in FIG. 12, in a case where a plurality of routes are detected as candidates for the route from the starting point to the destination, the display unit 303 may increase the density of displaying images (the number of frames of the images) for a section that is one of two branches starting at a fork 530 and that is to be passed through only when a first route 531 is selected and also for a section that is the other one of two branches starting at a fork 530 and that is to be passed through only when a second route 532 is selected.

The display unit 303 may also increase the displaying density of captured images for a particular section including a spot the user is planning to stop by, a section close to the destination, a section including a dangerous spot where many car accidents have occurred, a section including an intersection, a section where traffic congestion often occurs, a section that is currently jammed, an area in which there is a landmark such as a characteristic building, or the like. In this case, for example, the server apparatus 101 may acquire information about dangerous spots, traffic congestion, or the like from the outside, may store the acquired information, or may acquire information via inputting performed by a user.

(5) In a case where no captured image satisfying a search condition is found at a location close to a passing points, the image search unit 204 may loose the search condition and search for a captured image according to the loosed search condition. For example, in a case where captured images stored are only those captured in the night time, when the day time is specified as one of the search conditions, if the image search unit 204 tries to search for captured images according to the specified search conditions, no captured image satisfying the specified search conditions will be found at a location close to a passing point. In this case, the image search unit 204 may loose the search conditions by removing the day time from the search conditions, and the image search unit 204 may perform searching again according to the loosed search conditions. In this specific case, images captured in the night time may be found. In a case where a particular date, a particular day of the week, a particular weather, a particular traffic lane, and/or the like is specified as a search condition, the searching may be performed in a similar manner to that described above. In a case where the search condition is loosed and a captured image satisfying the loosed search condition is found, the display unit 303 may display information such as text information so as to overlap the displayed captured image to inform that the captured image displayed does not satisfy the search condition specified by a user.

Alternatively, in the case where no captured image satisfying a search condition is found, the display unit 303 may reduce the speed of displaying the captured images (the speed of switching the displayed captured images) immediately before (or after) the passing point, or may temporarily stop displaying the captured images, or otherwise may display an image indicating that no captured image is available. In such a case, the display unit 303 may display a section in a particular color on the map image to indicate no captured image is variable in this section thereby explicitly notifying a user that there is no captured image satisfying the search condition.

Figure 13:
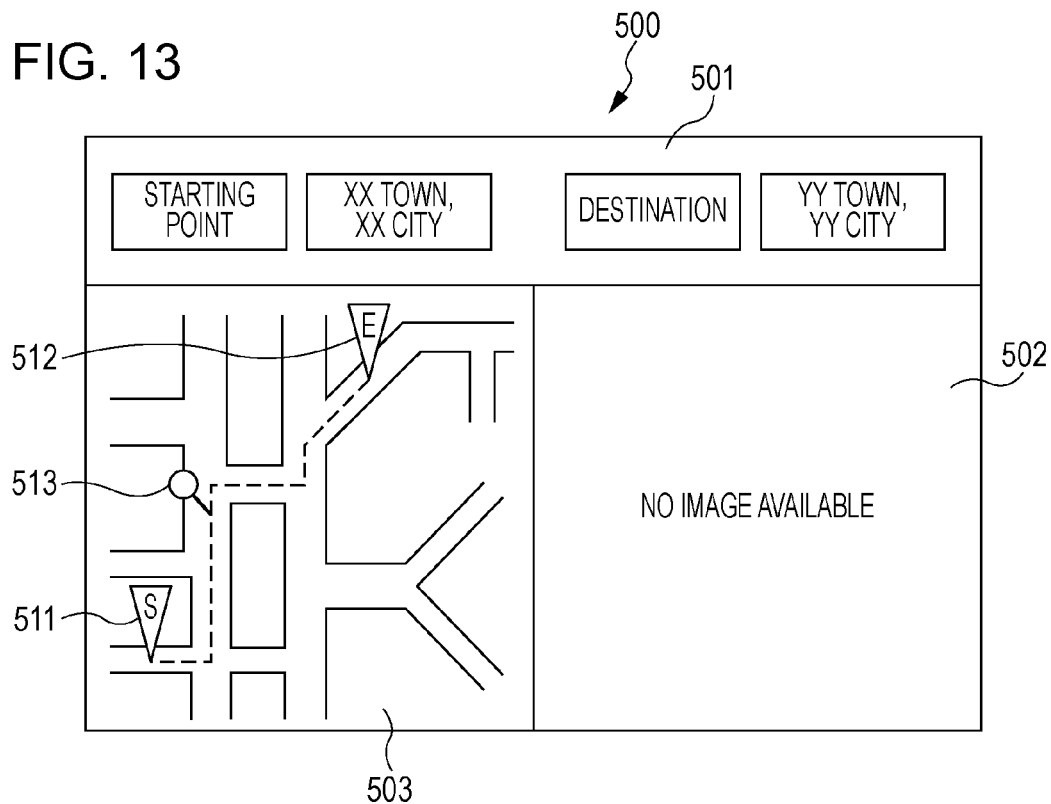
FIG. 13 is a diagram illustrating an example of a display screen which is displayed in a case where there is no captured image satisfying a search condition.

FIG. 13 is a diagram illustrating an example of a display screen which is displayed in a case where there is no captured image satisfying a search condition. As illustrated in FIG. 13, in the case where there is no captured image satisfying a search condition, the display unit 303 may display an image in the second display area 502 so as to indicate that there is no image. As described above, in the case where there is no captured image captured at a location exactly the same as or close to a passing point, the display unit 303 may display an image indicating that there is no image.

(6) The display unit 303 may display on a map image a marker (a passing point marker 513) that moves from the starting point to the destination, and may display a plurality of captured images sequentially in synchronization with the movement of the marker (the passing point marker 513). The input accepting unit 302 may accept an operation by a user in terms of moving of the marker (the passing point marker 513) to an arbitrary location on the route. The display unit 303 may display a captured image corresponding to an image capturing location closest to the moved location of the marker (the passing point marker 513) n the map.

In FIG. 5, the display unit 303 may display the passing point marker 513 corresponding to the captured image displayed in the second display area 502 such that the passing point marker 513 is allowed to be moved on the map image. In this case, in synchronization with the operation of moving the passing point marker 513, the display unit 303 may switch the displayed captured image to the captured image corresponding to the location on the map pointed to by the passing point marker 513. The display unit 303 may display a scroll bar on the screen such that its left-hand end of a moving range corresponds to the starting point and its right-hand end of the moving range corresponds to the destination (end point), and may move the scroll bar in response to the movement of the passing point marker 513. In response to the movement of the scroll bar, that is, in response to the operation of moving the scroll bar forward toward the right-hand end or backward toward the left-hand end, the display unit 303 may move the passing point marker 513 on the map image, and furthermore may switch the displayed captured image to the captured image corresponding to the location on the map pointed to by the passing point marker 513.

(7) The display unit 303 may display a captured image such that a license plate of a vehicle is blurred by mosaic processing or the like, and a person in the image is blurred or deleted by mosaic processing or the like. In this case, the display unit 303 may recognize the license plate of the vehicle or a face of the person in the captured image by using an image recognition technique, and may perform blurring processing or mosaic processing on the recognized license plate of the vehicle or the face of the person. Furthermore, the display unit 303 may delete an object such as a vehicle or another moving object, a shade of a building, or the like, unnecessary in watching the road condition or in virtual driving. In this case, the display unit 303 may recognize the unnecessary object such as the license plate of the vehicle or the like in the captured image by using the image recognition technique, and may perform processing to delete the recognized unnecessary object.

FIG. 14 is a diagram illustrating an example of a captured image in which a vehicle is deleted. As illustrated in FIG. 14, the display unit 303 may delete a vehicle from the captured image by using an image processing technique. Note that in the present embodiment, when the display unit 303 is displays a captured image, the display unit 303 deletes or blurs an unnecessary object in the captured image, but the present disclosure is not limited to this. Alternatively, for example, when the control unit 205 of the server apparatus 101 receives a captured image, it may delete or blur an unnecessary object in the captured image by using an image processing technique, and may stored the resultant captured image in the image storage unit 202.

(8) The display unit 303 may calculate a difference between a current time or a specified search condition (for example, a search condition in terms of date/time) and an image capturing date/time of an actually displayed captured image, and the display unit 303 may display information representing the calculated difference (that is, information representing the newness of the captured image) so as to overlap the captured image.

(9) The display apparatus 102 may further include a voice/sound output unit. When the display apparatus 102 displays a captured image corresponding to a passing point on a route, the voice/sound output unit may provide a voice/sound output to give an instruction as to which traffic lane to run, when to change the lane, or other instructions. The display apparatus 102 may display (reproduce) captured images not only such that the captured images are displayed before starting a travel, but also such that captured images are displayed during the travel depending on the travelling location. In this case, the voice/sound output unit may provide a voice/sound output to give an instruction as to which traffic lane to run, when to change the lane, or other instructions during the travel.

(10) The input accepting unit 302 may accept inputting by a user in terms of an arbitrary location on the map image, and the transmission/reception unit 301 may transmit information associated with the accepted arbitrary location to the server apparatus 101. The image search unit 204 of the server apparatus 101 may retrieve, from the image storage unit 202 (the database), a plurality of images captured at different times at a location corresponding to the accepted arbitrary location, and the transmission/reception unit 201 may transmit the retrieved captured images to the display apparatus 102. The display unit 303 of the display apparatus 102 may display the retrieved captured images sequentially in the order of time stating with the latest captured image.

The display unit 303 may display captured images not only such that the captured images corresponding to the image capturing locations exactly or closely to the passing points are sequentially displayed based on the information on the passing points on the route from the starting point to the destination, but also such that the input accepting unit 302 accepts specifying by a user in terms of an arbitrary passing point, and the display unit 303 displays a latest captured image captured at the specified passing point and may further display images captured at the specified passing points in the order of time backward to older times, for example, in the order 5 minutes ago, 10 minutes ago, 15 minutes ago, and so on. The display unit 303 may display a captured image captured at a past time at the specified passing points and may further display images captured at the specified passing points in the order of time from the past time toward the current time, for example, in the order 10 minutes ago, 5 minutes ago, and so on.

The input accepting unit 302 may accept specifying by a user in terms of an arbitrary passing point, and the display unit 303 may display a latest captured image captured at the specified passing point and may then further display captured images such that each time the latest captured image is updated, for example, 1 minutes later, 2 minutes later, and so on, the currently displayed captured image captured at the specified passing point is replaced with the updated captured image (so as to allow the user to watch the image at the fixed location).

(11) Part or all of the constituent elements of each apparatus described above may be implemented in the form of an IC card attachable to the apparatus or in the form of a single module. The IC card or the module is a computer system including a microprocessor, a ROM, a RAM, and the like. The IC card or the module may include the super-multifunction LSI described above. In the IC card or the module, the microprocessor operates according to the computer program thereby achieving the function of the IC card or the module. The IC card or the module may be configured so as to be resistant against tampering.

(12) The present disclosure may be implemented as a method. The method may be realized by a computer program that is to be executed by a computer or the method may be realized by a digital signal associated with the computer program.

In present disclosure, the computer program or the digital signal may be stored in a computer-readable storage medium. The computer-readable storage medium may be, for example, a flexible disk, a hard disk, a CD-ROM, an MO disk, a DVD disk, a DVD-ROM disk, a DVD-RAM disk, a BD (Blu-ray (registered trademark) Disc), a semiconductor memory, or the like. Note that the digital signal stored in such a storage medium falls into the scope of the present disclosure.

In the present disclosure, the computer program or the digital signal may be transmitted via a telecommunication line, a wireless communication line, a wired communication line, a network typified by the Internet, data broadcasting, or the like.

In the present disclosure, a computer system including a microprocessor and a memory, wherein the computer program is stored in the memory and the microprocessor operates according to the computer program.

The computer program or the digital signal may be stored in a computer-readable storage medium, and the computer program or the digital signal may be transferred to another separate computer system via the computer-readable storage medium such that the computer program or the digital signal may be executed on this separate computer system. The program or the digital signal may be transferred to another separate computer system via a network or the like and the program or the digital signal may be executed on this separate computer system.

(13) The details of the above-described embodiments and the modifications may be combined.

As described above, the present disclosure provides the route display method, the route display apparatus, and the database generation method, which make it possible to recognize a current road condition or traffic condition in advance and select a proper route. Furthermore, in the case where a user is going to travel along a route for the first time, the user is allowed to virtually travel along the route before starting the actual travel to get to know what the route looks like, which makes it possible to reduce an uneasy feeling of the user. Thus, the present disclosure provides the useful route display method in the route display system that displays a route from a starting point to a destination, the useful route display apparatus that displays a route from a starting point to a destination, and the useful database generation method for generating a database used in the route display system.

What is claimed is:

1. A route display method for display on a terminal apparatus, comprising:
   acquiring i) starting point information indicating a starting point and ii) destination information indicating a destination;
   generating route information indicating a route from the starting point to the destination, wherein the route is searched based on the starting point information and the destination information, and the route information includes a plurality of passing points on the route;
   extracting captured images corresponding to the plurality of the passing points from a database that stores the captured images in relation to corresponding image capturing locations respectively, wherein each of the image capturing locations is within a predetermined range from the each of the plurality of the passing points;
   displaying a map image representing the route on an electric display based on the route information; and
   displaying the extracted captured images with the map image sequentially in an order from a first captured image corresponding to a first passing point closest to the starting point to a second captured image corresponding to a second passing point closest to the destination, wherein the route includes a plurality of sections, wherein the plurality of sections includes a first section and second sections other than the first section, wherein a density of the passing points extracted in the first section is higher than a density of the passing points extracted in each of the second sections, so that a density of the extracted captured images displayed in the first section is higher than a density of the extracted captured images displayed in each of the second sections, and wherein the first section includes at least one of a section including a spot designated by a user of the terminal apparatus at which to stop, a section including the destination indicated by the destination information, a section including a dangerous spot designated by an outside source where many car accidents have occurred, a section including an intersection designated by the outside source, a section where traffic congestion often occurs designated by the outside source, and a section designated by the outside source that is currently jammed.

2. The route display method according to claim 1, further comprising:

displaying on the map image a marker so as to move along the route from the starting point displayed on the map image to the destination displayed on the map image, and sequentially displaying the extracted captured images in synchronization with the movement of the marker.

3. The route display method according to claim 2, further comprising:

in a case where it is determined that a simulation marker is moved to a selected location on the route, displaying a fifth captured image representing a fifth passing point closest to the selected location.

4. The route display method according to claim 1, wherein the extracted captured images are displayed before the user of the terminal apparatus starts to move.

5. The route display method according to claim 1, wherein at least one of the starting point information and the destination information is acquired by an input device via an operation of the user of the terminal apparatus.

6. The route display method according to claim 1, wherein at least one of the starting point information and the destination information is acquired by a communication circuit via a network.

7. The route display method according to claim 1, wherein the route is searched at a server to which the terminal apparatus is connected.

8. The route display method according to claim 1, wherein the starting point information is acquired by determining the starting point information based on i) pre-stored location information indicating a predetermined location related to a user of the terminal apparatus, or ii) current location information indicating a current location of the user of the terminal apparatus, and the destination information is acquired by predicting the destination information based on behavior history information of the user, the behavior history information indicating locations the user has visited in the past.

9. The route display method according to claim 8, wherein the predetermined location indicates a house in which the user of the terminal apparatus lives.

10. The route display method according to claim 1, wherein the database stores a plurality of captured images in relation to one of the image capturing locations, wherein each of the plurality of the captured images in relation to the one of the image capturing locations has a corresponding image capturing date/time, and wherein the method further includes:

extracting one captured image which has the latest image capturing date/time, among the plurality of the captured images in relation to the one of the image capturing locations within the predetermined range from one of the plurality of the passing points.

11. The route display method according to claim 1, further comprising:

displaying on the map image a first marker for the starting point, a second marker for the first location, a third marker for the destination, and a fourth marker for the second location, the first marker, the second marker, the third marker, and the fourth marker being different from each other.

12. The route display method according to claim 1, wherein the database stores each of the captured images in relation to at least one of i) an image capturing date/time of a corresponding captured image, ii) weather under which the corresponding captured image was captured, and iii) a vehicle type of a vehicle on which a camera that captures the corresponding captured image is installed.

13. The route display method according to claim 1, further comprising:

in a case where the database does not store corresponding captured images in relation to corresponding image capturing locations within the predetermined range from one of the plurality of the passing points, displaying an image indicating that there is no the corresponding captured images in relation to the corresponding image capturing locations within the predetermined range from the one of the plurality of the passing points.

14. The route display method according to claim 1, wherein a third captured image corresponding to a third passing point of the plurality of the passing point is displayed at a first time, and a fourth captured image corresponding to a fourth passing point adjacent to the third passing point is displayed at a second time, and wherein a time interval between the first time and the second time corresponds to a distance between the third passing point and the fourth passing point.

15. The route display method according to claim 1, wherein the database stores a plurality of captured images in relation to a corresponding image capturing location and to a corresponding image capturing date/time, and wherein the method further includes in a case where it is determined that a user of the terminal apparatus specifies a location on the map image, extracting from the database a plurality of the captured images that were captured at different times at an image capturing location corresponding to the specified location; and displaying the plurality of the extracted captured images sequentially in an order from the latest image capturing date/time in relation to the plurality of the extracted captured images.

16. The route display method according to claim 1,
wherein the route information includes latitude information and longitude information in relation to each of the plurality of the passing points.

17. The route display method according to claim 1,
wherein the starting point information includes latitude information and longitude information of the starting point, and
the destination information includes latitude information and longitude information of the destination.

18. A route display apparatus comprising:
a processor; and
a non-transitory memory storing thereon a program, which, when being executed by the processor, causes the processor to:
acquire i) starting point information indicating a starting point and ii) destination information indicating a destination;
display a map image representing a route from the starting point to the destination, wherein the route is searched by a server, connected to the route display apparatus via a network, based on the starting point information and the destination information, and a plurality of passing points are included in the route;
display captured images together with the map image sequentially in an order from a first captured image corresponding to a first passing point closest to the starting point to a second captured image corresponding to a second passing point closest to the destination,
wherein the captured images are extracted, by the server, from a database that stores the captured images in relation to corresponding image capturing locations, respectively, and the extracted captured images correspond to the plurality of the passing points, wherein each of the image capturing locations is within a predetermined range from each of the plurality of passing points,
wherein the route includes a plurality of sections,
wherein the plurality of sections includes a first section and second sections other than the first section,
wherein a density of the passing points extracted in the first section is higher than a density of the passing points extracted in each of the second sections, so that a density of the extracted captured images displayed in the first section is higher than a density of the extracted captured images displayed in each of the second sections, and
wherein the first section includes at least one of a section including a spot designated by a user at which to stop, a section including the destination indicated by the destination information, a section including a dangerous spot designated by an outside source where many car accidents have occurred, a section including an intersection designated by the outside source, a section where traffic congestion often occurs designated by the outside source, and a section designated by the outside source that is currently jammed.

\* \* \* \* \*